US 8,746,735 B2

(12) United States Patent
Meister et al.

(10) Patent No.: US 8,746,735 B2
(45) Date of Patent: Jun. 10, 2014

(54) INFLATABLE SHOULDER HARNESS ASSEMBLY FOR AN AIRCRAFT SEAT

(75) Inventors: Pete C. Meister, Miami, FL (US); Michael Oleston, Parkland, FL (US)

(73) Assignee: BE Aerospace, Inc., Wellington, FL (US)

( * ) Notice: Subject to any disclaimer, the term of this patent is extended or adjusted under 35 U.S.C. 154(b) by 50 days.

(21) Appl. No.: 13/551,071

(22) Filed: Jul. 17, 2012

(65) Prior Publication Data

US 2014/0021771 A1 Jan. 23, 2014

(51) Int. Cl.
*B60R 21/18* (2006.01)
(52) U.S. Cl.
USPC .......................................................... 280/733
(58) Field of Classification Search
USPC .......................................................... 280/733
See application file for complete search history.

(56) References Cited

U.S. PATENT DOCUMENTS

| | | | | |
|---|---|---|---|---|
| 3,682,498 A | * | 8/1972 | Rutzki | 280/733 |
| 4,348,037 A | * | 9/1982 | Law et al. | 280/733 |
| 6,276,715 B1 | * | 8/2001 | Takeuchi | 280/733 |
| 6,419,263 B1 | * | 7/2002 | Busgen et al. | 280/733 |
| 7,681,911 B2 | * | 3/2010 | Ruthinowski et al. | 280/733 |
| 8,007,001 B2 | * | 8/2011 | Lin | 280/733 |
| 2002/0067031 A1 | * | 6/2002 | Busgen et al. | 280/733 |
| 2013/0221642 A1 | * | 8/2013 | Arnold et al. | 280/733 |

* cited by examiner

*Primary Examiner* — Faye M. Fleming
(74) *Attorney, Agent, or Firm* — Shumaker, Loop & Kendrick, LLP

(57) ABSTRACT

An inflatable shoulder harness assembly for an aircraft seat including a shoulder belt, a retractor, an airbag contained within an outer cover, and a belt guide slideably receiving the inflatable airbag and outer cover therein when the shoulder belt is retracted, the belt guide defining an elongate channel for facilitating free movement of the outer cover during belt fastening and retraction. The assembly further includes an exit bezel for finishing the look of the seat and a stiffening element for preventing kinking, bunching and twisting of the outer cover.

18 Claims, 7 Drawing Sheets

INFLATABLE SHOULDER HARNESS ASSEMBLY FOR AN AIRCRAFT SEAT

FIELD OF THE INVENTION

The present invention relates generally to the field of passenger restraints for seats such as aircraft seats, and more particularly, to an inflatable shoulder harness assembly including a belt guide configured for guiding free movement of the airbag portion of the restraint during fastening and retraction.

BACKGROUND OF THE INVENTION

Aircraft passenger seats such as side facing seats and divans can include a shoulder harness to limit the amount of head and torso movement. For example, a shoulder harness can be pulled over the shoulder and placed across the chest to help reduce occupant movement, better protect the neck, and prevent head impact on adjacent monuments or furniture.

Airbag technology has recently been applied to passenger restraints in automobiles to improve the performance of such restraints. Conventional restraints for automobiles, however, are typically wound on inertia reels near to or adjacent to the side of the seat, for example, in the B-pillar. In an aircraft, it may not be possible to house the restraint in the structure adjacent to the seat because of the lack of such structures in certain seating arrangements.

For aviation seating, there is a need for an inflatable restraint configured to be mounted to a seat itself. There is also a need for an inflatable shoulder harness configured for free movement during belt fastening and retraction. There is also a need for an inflatable shoulder harness that integrates into the seat to provide an aesthetic stowage solution typical of luxury finishing of seats and divans.

BRIEF SUMMARY OF THE INVENTION

In one aspect, an inflatable shoulder harness assembly for use with a seat such as an aircraft seat is provided herein.

In another aspect, the seat is a side facing aircraft seat or divan.

In another aspect, the inflatable shoulder harness is mounted to the seat itself, for example, within portions of the seat frame and concealed from view beneath the seat upholstery.

In another aspect, the inflatable shoulder harness includes guiding structure configured for guiding free movement of the airbag portion during belt fastening and retraction.

In another aspect, the inflatable shoulder harness can attach to a lap belt tongue.

In another aspect, the inflatable shoulder harness can be a component of a 3-point seat belt.

In another aspect, the inflatable shoulder harness can have its own tongue and buckle separate from those of the lap belt.

In another aspect, the inflatable shoulder harness can cross diagonally over the passenger's shoulder and buckle about the passenger's lap.

In another aspect, the free end of the shoulder harness can exit through a bezel positioned at the top of the seat cushion.

In another aspect, a retractor of the assembly is configured for paying in and paying out a portion of the length of the shoulder belt not including the airbag and an airbag cover.

In another aspect, the assembly includes a belt guide defining a channel within which the airbag containing portion of the restraint is stowed when not in use, and through which the airbag slides from in use to provide smooth sliding motion and protection of the airbag portion during retraction and withdrawal.

In another aspect, the shoulder belt includes a stiffening element incorporated into the airbag cover for aiding in retraction by preventing kinking and bunching of the airbag cover as the cover slides through the exit bezel.

To achieve the foregoing and other aspects and advantages, in one embodiment an inflatable shoulder harness for use with a seat such as an aircraft passenger seat is provided herein including a shoulder belt for extending across the torso of a passenger, a retractor for paying in and paying out a portion of the length of the shoulder belt, an inflatable airbag contained within an airbag cover attached to the shoulder belt near a free end of the shoulder belt, and a belt guide for stowing a portion of the shoulder belt, the inflatable airbag and the airbag cover when the inflatable shoulder harness is not in use, the belt guide configured for facilitating free movement of the airbag cover during shoulder belt fastening and retraction.

The assembly can further include an exit bezel positioned at the top of the aircraft seat for receiving the outer cover slideably therethrough as the airbag cover is withdrawn and retracted from the belt guide.

The assembly can further include a stiffening element coextensive with the inflatable airbag and the airbag cover for preventing kinking, gathering and twisting of the airbag cover as the airbag cover slides through the exit bezel.

The shoulder belt can terminate at its free end in a buckle or may be otherwise attached to a lap belt of the seat. The shoulder belt can have a bezel closeout attached thereto proximate the buckle or attachment point for being received within the exit bezel to close an opening through the bezel when the airbag cover is fully retracted into the belt guide, the bezel closeout further limiting the retraction of the shoulder belt.

The assembly can further include a fill tube in fluid communication with the inflatable airbag for supplying an inflating gas to the inflatable airbag.

In another embodiment, provided herein is an aircraft passenger seat including a seat back and an inflatable shoulder harness assembly associated with the seat back and including a shoulder belt for extending across the torso of a passenger, a retractor for paying in and paying out a portion of a length of the shoulder belt, an inflatable airbag contained within an airbag cover attached to the shoulder belt near a free end of the shoulder belt, and a belt guide separate from the retractor and defining a channel for stowing the inflatable airbag and the airbag cover when the inflatable shoulder harness is not in use, wherein the belt guide is configured for facilitating free movement of the airbag cover during shoulder belt fastening and retraction.

The inflatable shoulder harness assembly can further include an exit bezel positioned at the top of the seat back for receiving the outer cover slideably therethrough as the airbag cover is withdrawn and retracted from the belt guide.

The inflatable shoulder harness assembly can further include a stiffening element coextensive with the inflatable airbag and the airbag cover for preventing kinking and gathering of the outer cover as the outer cover slides through the exit bezel and the belt guide.

The belt guide can be positioned along the back and bottom of the seat such as concealed from view beneath the seat upholstery.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
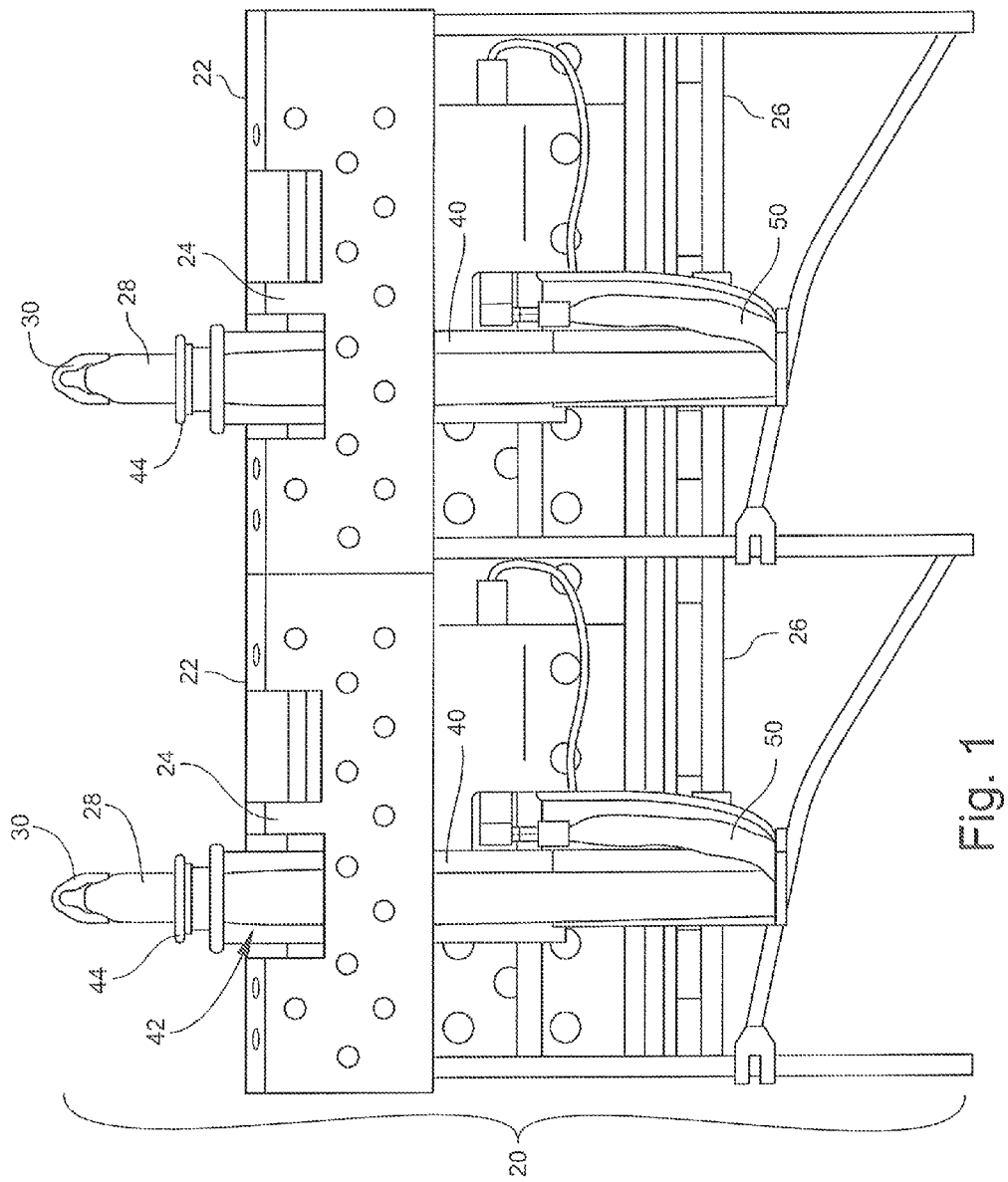
FIG. 1 is a rear elevation view of a pair of exemplary passenger seats each including an inflatable shoulder harness according to the present invention.
Figure 2:
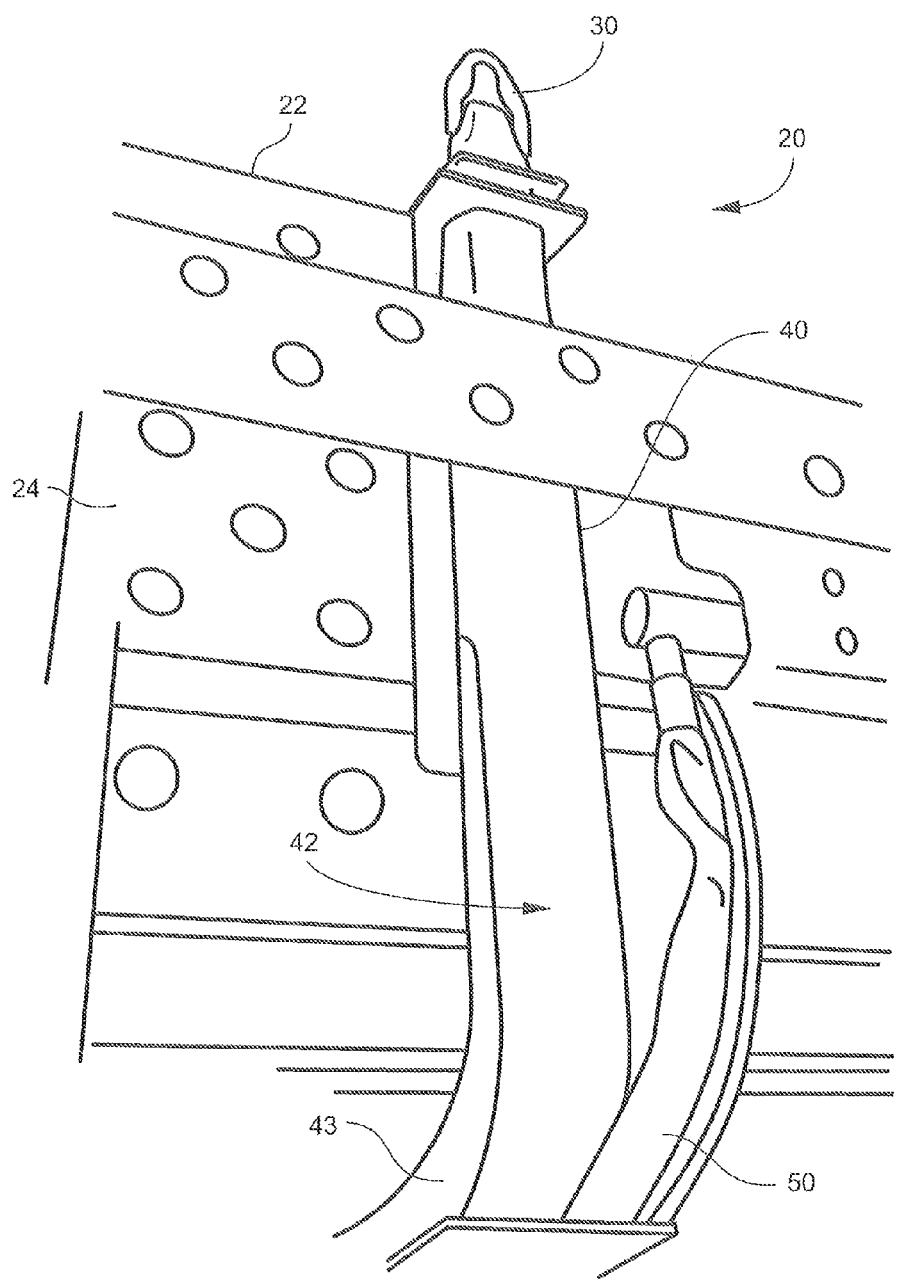
FIG. 2 is a detailed view of a portion of the belt guide and fill tube of the assembly.
Figure 3:
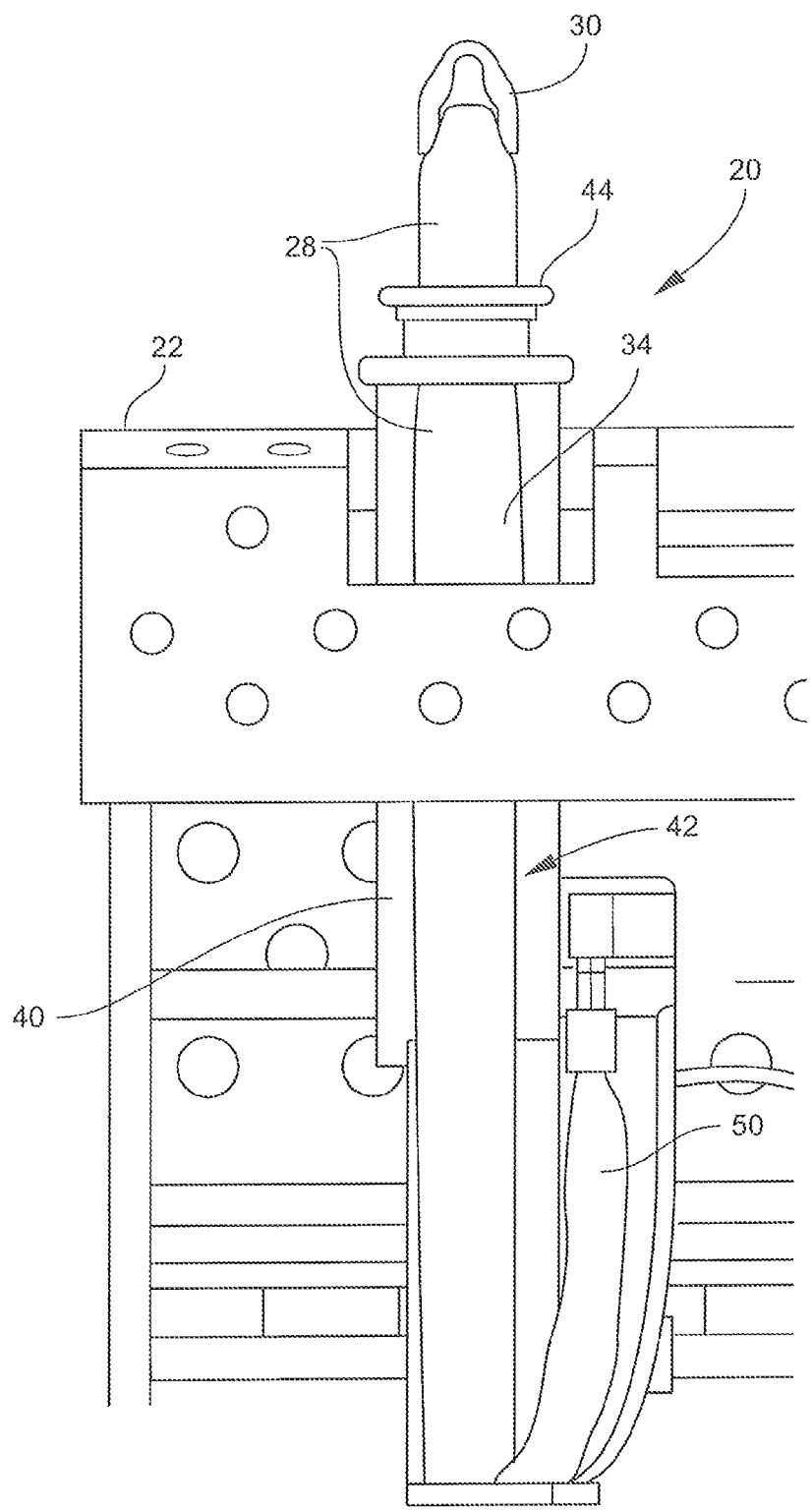
FIG. 3 shows the positioning of the belt guide, fill tube and exit bezel on the seat.

Referring now to the drawings, an inflatable shoulder harness assembly associated with a seat such as an aircraft passenger seat is shown generally at reference numeral 20. An exemplary aircraft passenger seat, such as the seat shown generally at reference numeral 22, may be a side facing seat, divan or other seat type benefiting from a shoulder harness according to the present invention. As shown in FIG. 1, the seat 22 includes a seat back 24 and a seat bottom 26, among other components, and may be arranged as a single seat, within a row of seats or in any other seating arrangement. The configuration of the seat frame is not critical, as the assembly 20 may be supported by/within various seat frame configuration.

The inflatable shoulder harness assembly 20 includes a shoulder belt portion 28 that extends diagonally across the upper torso of the occupant of the seat from about the shoulder to the waist. The shoulder belt 28 has a predetermined length and may terminate at its free end in a buckle 30 that releasably latches within a receiver anchored about the waist of the seat occupant as known to those skilled in the art. The shoulder belt 28 can also attach to a conventional lap belt by other means to cooperatively form a 3-point seat belt. Other seat belt configurations and anchor points can be employed for the assembly 20 disclosed herein.

The shoulder belt 28 includes an inflatable airbag 32 configured to inflate by means of an inflating gas as a result of a triggering event, for example, impact. The inflatable airbag 32 can have any length coextensive with the shoulder belt 28, but preferably has a length sufficient to protect the torso, neck and head of the seat occupant. The airbag 32 is covered along its length by an airbag cover 34. The airbag cover can be sewn or otherwise attached to the webbing of the shoulder belt 28. The airbag cover 34 may attach to the shoulder belt 28 near the buckle 30.

Because the airbag 32 and airbag cover 34 are flexible and prone to bunching and kinking, particularly during retraction, a stiffening element 36 is positioned beneath the airbag cover 34 and coextensive therewith for providing smooth operation in an out of the exit bezel and belt guide as described below. The stiffening element 36 is preferably flexible about its longitudinal axis so that it can bend as it slides through the exit bezel, but is incapable of bunching, kinking, twisting or folding over itself. The stiffening element 36 may be adhered to or otherwise affixed to the airbag cover 34, such as affixed to the underside of the shoulder belt 28 positioned on the side of the airbag 32 adjacent the seat occupant. A function of the stiffening element 36 is to aid in the retraction process by preventing kinking and gathering of the loose airbag cover 34 as the airbag cover 34 retracts into the exit bezel. It also provides a means to prevent twisting of the airbag 32 so as to ensure proper attachment of the buckle 30 to the receiver.

Figure 4:
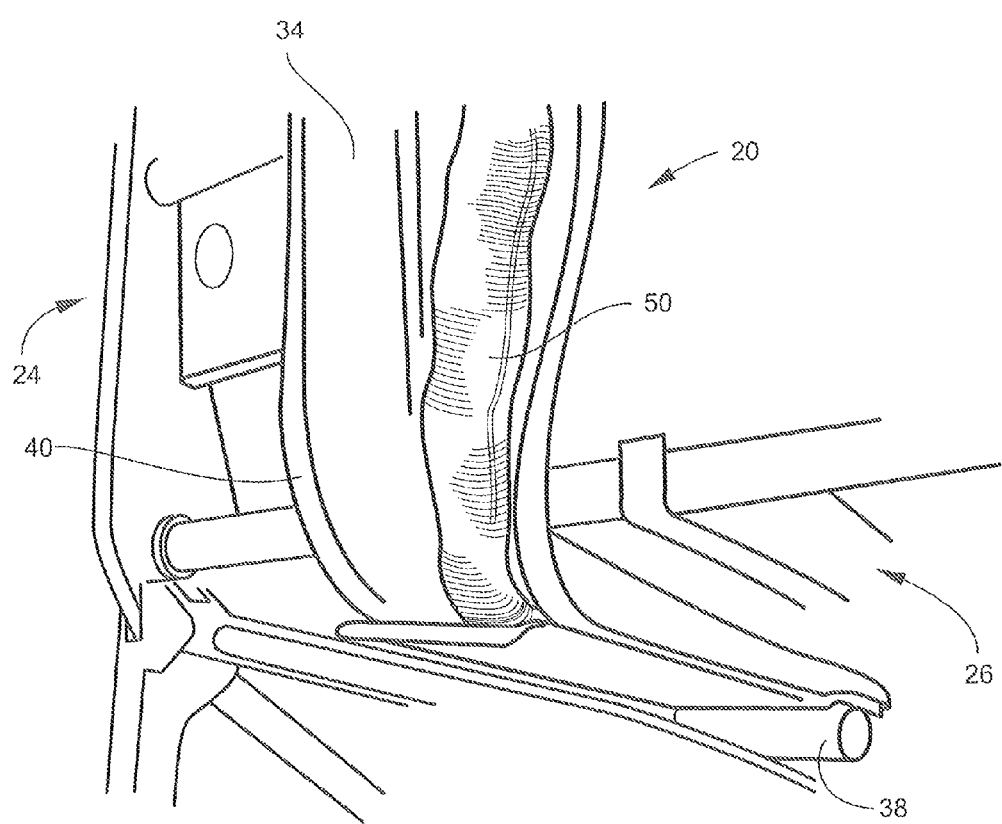
FIG. 4 shows the curvature of the belt guide along the back and bottom of the seat.

The inflatable shoulder harness assembly 20 further includes a conventional retractor 38 including an inertia reel for paying in and paying out a portion of the length of the shoulder belt 28 not including the inflatable airbag 32 and the airbag cover 34. Thus, the retractor 38 pays in and out a length of the shoulder belt 28 upstream of the airbag 32 with respect to the buckle 30. Referring to FIG. 4, the retractor 38 may be positioned under the seat bottom 26 and forward of the bottom end of the belt guide as described below, or mounted to the vehicle, for example, to the aircraft floor. The retractor 38 is preferably concealed from view from above for aesthetic reasons.

The inflatable shoulder harness assembly 20 further includes a belt guide 40 for guiding free movement of the shoulder belt 28, airbag 32 and airbag cover 34 during retraction and withdrawal. As shown in FIGS. 1-4, the belt guide 40 may be positioned along the contour of the backside and bottom of the seat 22. The belt guide 40 can have a length generally corresponding to the length of the outer cover 34. The outer cover segment of the restraint is stowed within the belt guide 40 when the restraint is not in use, and slides relative to the belt guide 40 when retracted and withdrawn. Thus, the belt guide 40 can also be referred to as the "airbag slide."

The belt guide 40 defines an elongate channel 42 within which the airbag cover 34 slides. The channel 42 includes an elongate, major planar portion with at least one flange 43 extending outwardly therefrom in the direction away from the seating surface. The shoulder belt 28 is maintained, positioned, or cradled by the flange when in use and when stowed. The belt guide 40 isolates the shoulder belt 28 from entanglement with wires or other seat components during retraction and withdrawal. The belt guide 40 can be attached to the seat frame and follows the contour thereof, and thus may have both generally vertical and horizontal portions with a gentle curve therebetween to facilitate smooth sliding movement of the airbag cover 34. The belt guide 40 may be attached within the seat frame and concealed from view beneath the seat upholstery. The belt guide 40, as well as the stiffening element 36 and other assembly components, may be constructed from thermoplastic acrylic-polyvinyl chloride or like low-friction materials commonly used in aircraft interiors.

Figure 5:
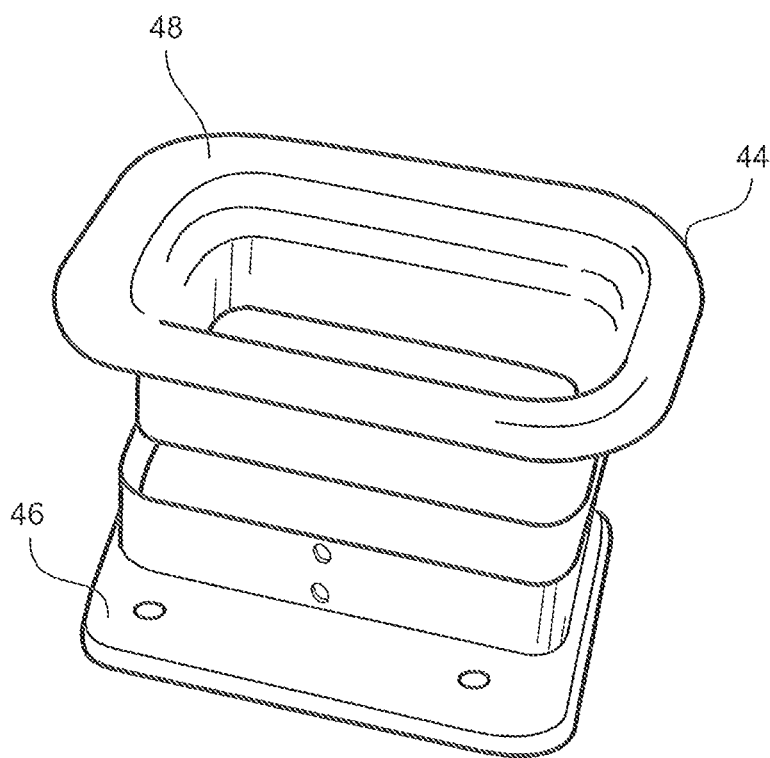
FIG. 5 shows the two-piece construction of the exit bezel.
Figure 6:
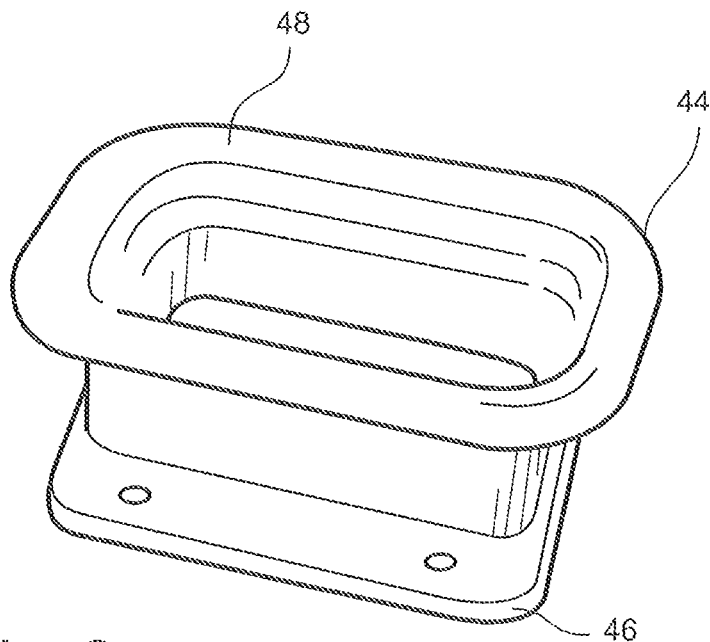
FIG. 6 shows the exit bezel in its assembled configuration.
Figure 7:
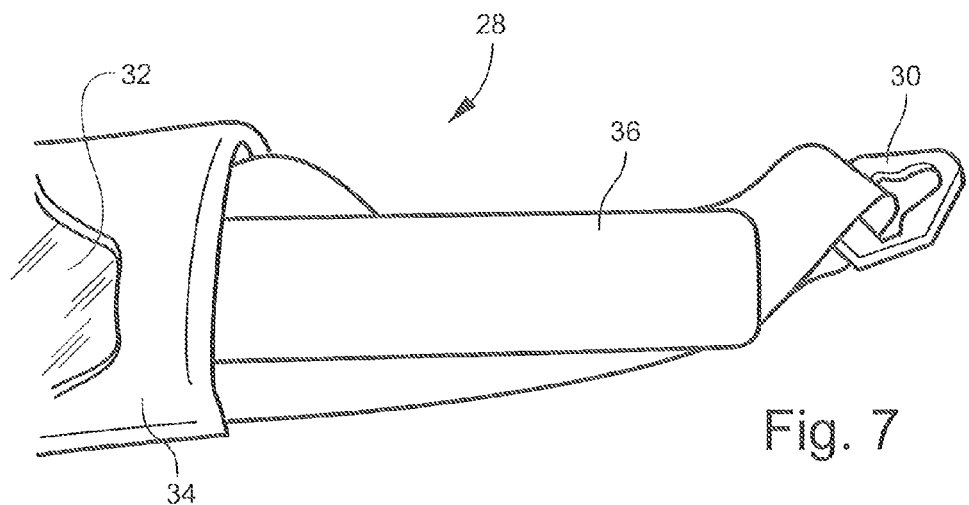
FIG. 7 shows the positioning of the stiffening element between the airbag cover and the restraint webbing.

To finish the look of the seat 22, as well as provide an exit point for the airbag cover 34 from the seat cushion, an exit bezel 44 is positioned near the top of the seat through which the airbag cover 34 exits the belt guide 40 and seat cushion. The exit bezel 44 may be directly attached to the top, upper end of the belt guide 40, or may be attached to other seat structure positioned near the exit of the belt guide 40. Referring to FIGS. 5 and 6, the exit bezel 44 can be constructed of two components, the first component 46 being attached to the top of the belt guide 40, or upper end of the seat structure, and having an opening large enough to pass the airbag cover 34 therethrough as the airbag cover 34 slides in and out of the exit bezel 44, and the second component 48 being a finishing piece that attaches to the top of the first component 46 to finish the look of the seat. The second component 48 also has an opening therethrough large enough to pass the airbag cover 34 therethrough. The first and second components 46, 48 may be fastened together or may be integrally formed. The look of the exit bezel may be customized to finish the look of the seat consistent with luxury seat finishing.

The belt guide 40 may further assist in positioning a fill tube 50 for supplying an inflating gas to the inflatable airbag 32. The fill tube 50 may be attached to one or more of the inflatable airbag 32 and the airbag cover 34. The fill tube 50 is in fluid communication with a gas supply.

Figure 8:
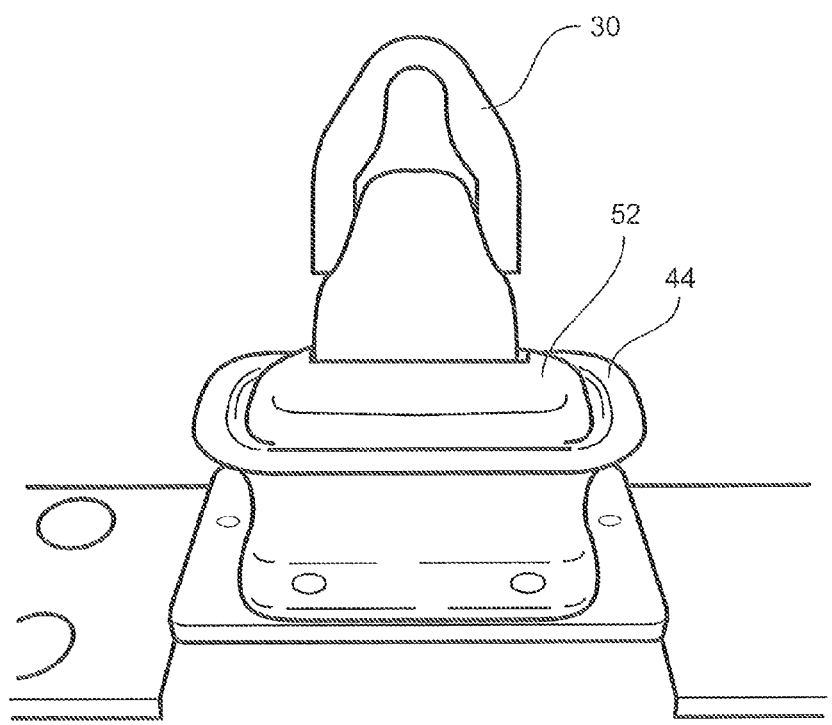
FIG. 8 shows the bezel closeout received within the exit bezel.
Figure 9:
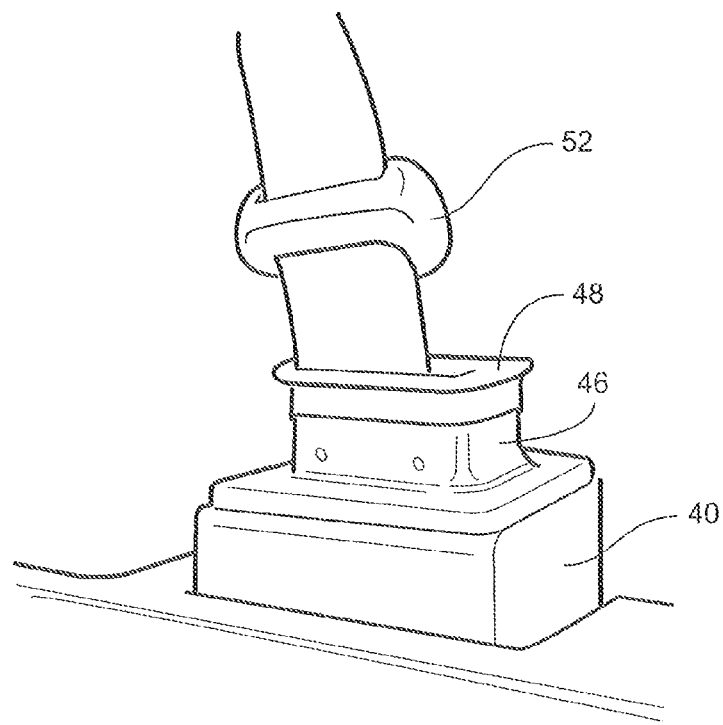
FIG. 9 shows the shoulder belt being withdrawn through the exit bezel.
Figure 10:
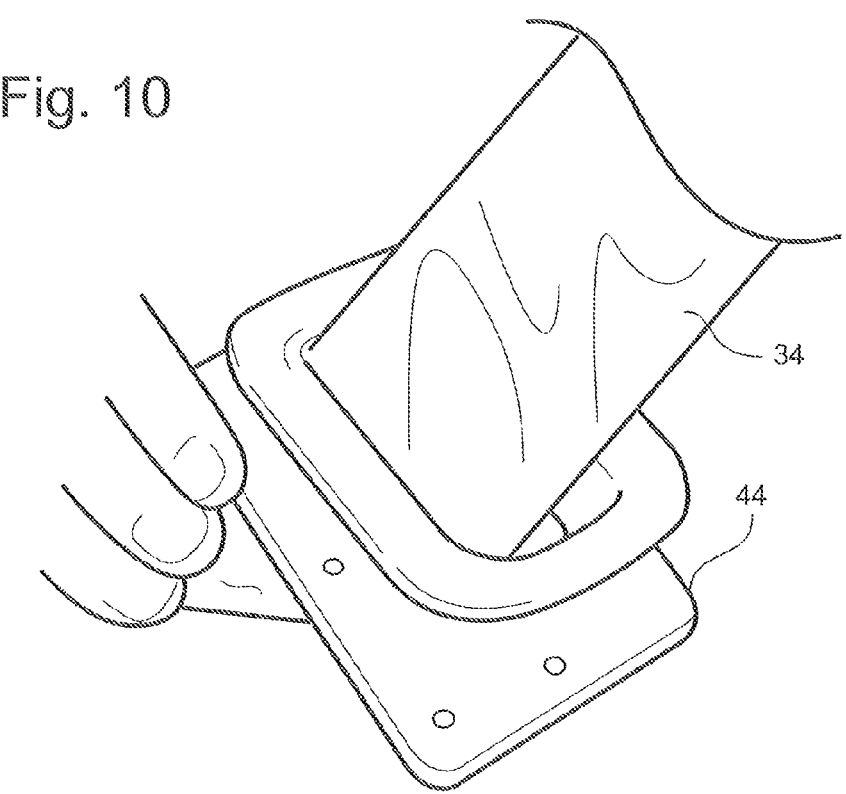
FIG. 10 shows the airbag cover being pulled through the exit bezel.

Referring to FIGS. 8-9, the assembly can include a bezel closeout 52 attached directly to the webbing of the shoulder belt near the free end of the shoulder belt, i.e., near the buckle 30. In the specific configuration shown, the bezel closeout 52 has a clamshell configuration and closes on itself around the shoulder belt 28. The bezel closeout 52 functions to close the opening through the exit bezel 44 when the shoulder belt 28 is fully retracted, as well as limit the retraction of the shoulder belt 28 into the seat to prevent the shoulder belt from "falling behind" the seat. Referring to FIG. 8, leaving a portion of the shoulder belt 28 and the buckle 30 outside of the seat cushion in the fully retracted position permits the seat occupant to grab to pull the shoulder belt in use. The bezel closeout 52 can be turned sideways to pull it through the exit bezel 44 if necessary.

In operation, the seat occupant grabs the shoulder belt free end and pulls on the assembly, which slides freely in the belt guide 40 and exits through the exit bezel 44. The stiffening element 36 positioned beneath the airbag cover 34 slides smoothly through the exit bezel 44. The shoulder belt 28 is pulled from the belt guide 40 a length sufficient for the buckle 30 to latch within an anchor about the seat occupant's waist. Upon egress, the buckle 30 is unlatched from its anchor and the shoulder belt 28 freely retracts through the exit bezel 44 with the aid of the stiffening element 36 and by the action from the inertia reel of the retractor 38. The shoulder belt 28 retracts through the exit bezel 44 and the belt guide 40 until the bezel closeout 52 becomes engaged within the exit bezel 44 and finishes the look of the seat.

The foregoing description provides embodiments of the invention by way of example only. It is envisioned that other embodiments may perform similar functions and/or achieve similar results. Any and all such equivalent embodiments and examples are within the spirit and scope of the present invention and are intended to be covered by the appended claims.

What is claimed is:

1. An inflatable shoulder harness assembly for an aircraft seat, comprising:
    a shoulder belt for extending across the torso of a passenger;
    a retractor for paying in and paying out a portion of the shoulder belt length;
    an inflatable airbag contained within an airbag cover attached to the shoulder belt near a free end of the shoulder belt;
    a belt guide slidably receiving the shoulder belt, the inflatable airbag and the airbag cover therein when the shoulder belt is retracted, the belt guide defining an elongate channel configured for facilitating free movement of the airbag cover during shoulder belt fastening and retraction; and
    an exit bezel positioned near an exit of the belt guide for receiving the shoulder belt, the inflatable airbag and the airbag cover slidably therethrough as the shoulder belt is withdrawn and retracted from the belt guide.

2. The shoulder harness assembly according to claim 1, further comprising a stiffening element coextensive with the inflatable airbag and the airbag cover for preventing kinking, twisting and gathering of the outer cover as the outer cover slides through the exit bezel.

3. The shoulder harness assembly according to claim 1 wherein the shoulder belt terminates at its free end in a buckle.

4. The shoulder harness assembly according to claim 3, further comprising a bezel closeout attached to the shoulder belt near the buckle for limiting retraction of the shoulder belt, the bezel closeout being received within the exit bezel to close an opening through the exit bezel when the airbag cover is fully retracted into the belt guide.

5. The shoulder harness assembly according to claim 1, wherein the belt guide is positioned between the retractor and the exit bezel, and the airbag cover is not wound on the retractor.

6. The shoulder harness assembly according to claim 1, further comprising a fill tube positioned adjacent the belt guide for supplying an inflating gas to the inflatable airbag.

7. The shoulder harness assembly according to claim 1, wherein the belt guide is arranged vertically along a seat back of the aircraft seat.

8. The shoulder harness assembly according to claim 1, wherein the belt guide is arranged along the back and bottom of the aircraft seat.

9. An aircraft passenger seat, comprising:
    a seat back and a seat bottom; and
    an inflatable shoulder harness assembly associated with the seat back and the seat bottom including:
        i) a shoulder belt for extending across the torso of a passenger;
        ii) a retractor for paying in and paying out a portion of the shoulder belt length;
        iii) an inflatable airbag contained within an airbag cover attached to the shoulder belt near a free end of the shoulder belt; and
        iv) a belt guide defining an elongate channel for slidably receiving a portion of the shoulder belt, the inflatable airbag and the airbag cover therein when the shoulder belt is retracted, and from which the shoulder belt, the inflatable airbag and the airbag cover are withdrawn when the shoulder belt is in use, the belt guide being arranged along the back of the seat back and the bottom of the seat bottom.

10. The aircraft passenger seat according to claim 9, further comprising an exit bezel positioned near an exit of the belt guide and near a top of the seat back for receiving the shoulder belt, the inflatable airbag and the airbag cover slidably therethrough as the shoulder belt is withdrawn and retracted from the belt guide.

11. The aircraft passenger seat according to claim 10, further comprising a bezel closeout attached to the shoulder belt near the buckle for limiting retraction of the shoulder belt, the bezel closeout being received within the exit bezel to close an opening through the exit bezel when the airbag cover is fully retracted into the belt guide.

12. The aircraft passenger seat according to claim 10, further comprising a stiffening element coextensive with the inflatable airbag and the airbag cover for preventing kinking, twisting and gathering of the airbag cover as the airbag cover slides through the exit bezel.

13. The aircraft passenger seat according to claim 10, wherein the exit bezel is positioned near one end of the belt guide and the retractor is positioned near an opposing end of the belt guide, and wherein the shoulder belt, the inflatable airbag and the airbag cover are stowed within the belt guide when the shoulder belt is fully retracted.

14. The aircraft passenger seat according to claim 9, wherein the shoulder belt terminates at its free end in a buckle.

15. The aircraft passenger seat according to claim 9, further comprising a fill tube arranged adjacent the belt guide for supplying an inflating gas to the inflatable airbag.

16. The aircraft passenger seat according to claim 9, wherein the belt guide is arranged substantially vertically along the seat back.

17. The aircraft passenger seat according to claim 10, wherein the belt guide is positioned between the retractor and the exit bezel, and the airbag cover is not wound on the retractor.

18. The aircraft passenger seat according to claim 9, wherein the belt guide extends along the vertical length of the seat back.

* * * * *